United States Patent
Ninomiya

(10) Patent No.: US 10,103,650 B2
(45) Date of Patent: Oct. 16, 2018

(54) DRIVING DEVICE

(71) Applicant: CANON KABUSHIKI KAISHA, Tokyo (JP)

(72) Inventor: Shunsuke Ninomiya, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 14/937,283

(22) Filed: Nov. 10, 2015

(65) Prior Publication Data

US 2016/0141979 A1 May 19, 2016

(30) Foreign Application Priority Data

Nov. 19, 2014 (JP) ................. 2014-234105

(51) Int. Cl.
  *H02N 2/00* (2006.01)
  *H02N 2/02* (2006.01)
(52) U.S. Cl.
  CPC ........... *H02N 2/026* (2013.01); *H02N 2/0015* (2013.01); *H02N 2/0085* (2013.01)
(58) Field of Classification Search
  CPC .... H02N 2/026; H02N 2/0015; H02N 2/0085; H02N 2/001; H02N 2/006; H02N 2/0065
  USPC ............... 310/323.02, 323.09, 323.16
  See application file for complete search history.

(56) References Cited

U.S. PATENT DOCUMENTS

| | | | |
|---|---|---|---|
| 7,576,778 B2 | 8/2009 | Hirota et al. | |
| 8,330,328 B2* | 12/2012 | Tsubata | H02N 2/004 |
| | | | 310/323.01 |
| 2005/0062346 A1* | 3/2005 | Sasaki | G02B 7/102 |
| | | | 310/323.05 |
| 2010/0060107 A1* | 3/2010 | Seki | H02N 2/004 |
| | | | 310/323.16 |
| 2011/0057543 A1* | 3/2011 | Adachi | H01L 41/0913 |
| | | | 310/323.02 |
| 2013/0147978 A1* | 6/2013 | Ohashi | G02B 27/646 |
| | | | 348/208.7 |
| 2014/0125199 A1* | 5/2014 | Furuta | C04B 35/4682 |
| | | | 310/323.06 |

FOREIGN PATENT DOCUMENTS

| | | |
|---|---|---|
| JP | 2005-057837 A | 3/2005 |
| JP | 2006-081006 A | 3/2006 |
| JP | 2012-227988 A | 11/2012 |

OTHER PUBLICATIONS

U.S. Appl. No. 14/884,190, filed Oct. 15, 2015, Hitoshi Nishitani, Shunsuke Ninomiya.
Office Action dated Aug. 28, 2018, in Japanese Patent Application No. 2014-234105.

* cited by examiner

*Primary Examiner* — Bryan Gordon
(74) *Attorney, Agent, or Firm* — Fitzpatrick, Cella, Harper & Scinto

(57) ABSTRACT

In a piezoelectric driving device, a load due to flection deformation of a flexible substrate can be prevented from being applied to a piezoelectric element and decrease in driving efficiency of the driving device can be prevented. The flexible substrate of the driving device includes a first fixing portion fixed to the piezoelectric element, a second fixing portion fixed to a holding member, and a bending portion in which the flection deformation is formed with movement of a vibrating plate. The second fixing portion is provided between the first fixing portion and the bending portion along the flexible substrate.

9 Claims, 16 Drawing Sheets

FIG. 6A
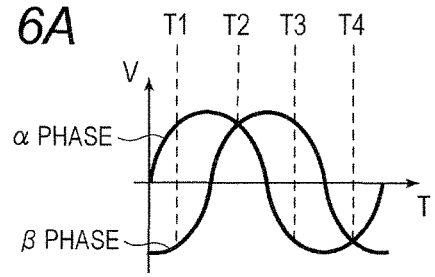
FIG. 6C  FIG. 6B  FIG. 6D
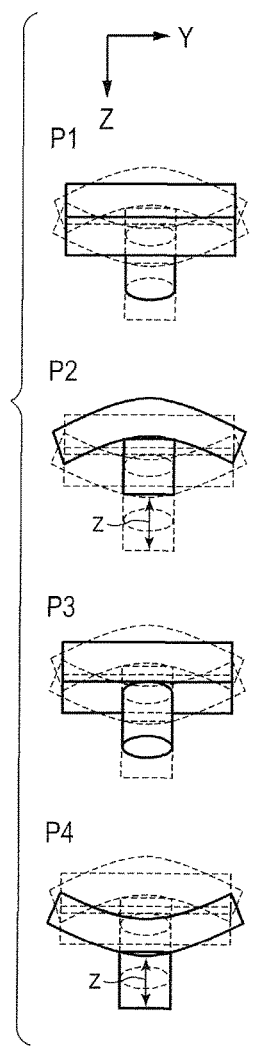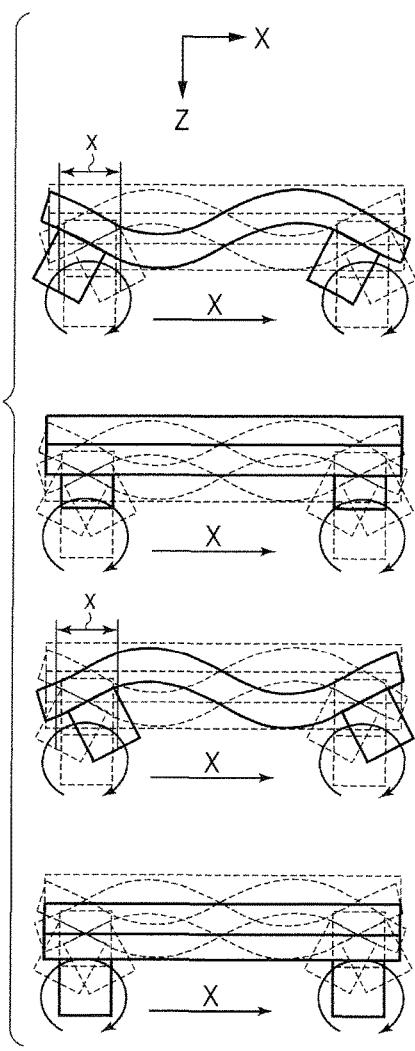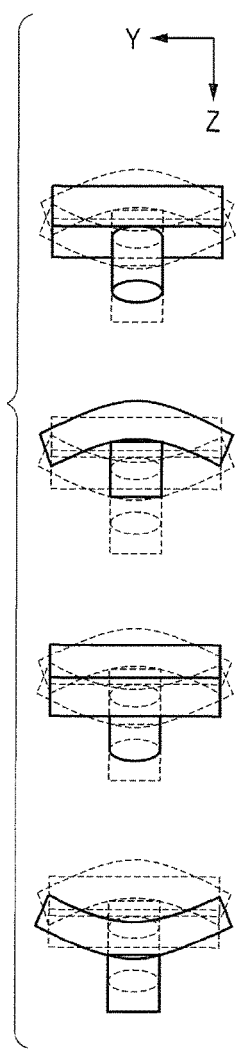

DRIVING DEVICE

BACKGROUND OF THE INVENTION

Field of the Invention

The present invention relates to a driving device for linear driving, which uses a plate-shaped elastic body.

Description of the Related Art

Conventionally, a driving device that features a compact and light-weight body, high-speed driving, and silent driving has been employed in a lens barrel of an image capturing apparatus or the like. In particular, concerning a driving device for linear driving, Japanese Patent Application Laid-Open No. 2005-57837 discloses a driving device (ultrasonic motor) to be described below.

The ultrasonic motor disclosed in Japanese Patent Application Laid-Open No. 2005-57837 includes a rectangular vibrating plate on which a piezoelectric element is fixed, a friction member that comes into contact with a contact portion provided on the vibrating plate, and a flexible substrate configured to supply power to the piezoelectric element. The vibrating plate obtains a driving force by a vibration generated by the piezoelectric element and moves relative to the friction member. The flexible substrate is fixed to an electrode on the piezoelectric element and led from the fixing portion in the moving direction and thus disposed so as to be folded while bending halfway. Power is supplied to the moving vibrating plate via the flexible substrate including such a bending portion.

In the composition that moves the vibrating plate relative to the friction member, as in the ultrasonic motor disclosed in Japanese Patent Application Laid-Open No. 2005-57837, a structure that supplies power via the flexible substrate including a bending portion is indispensable. In this structure, the flexible substrate makes a flection deformation along with the movement of the vibrating plate. With this flection deformation, a load is applied, via the flexible substrate, to the piezoelectric element to which the flexible substrate is fixed. This load impedes a vibration necessary for driving, which is generated by the piezoelectric element, and the driving efficiency of the ultrasonic motor lowers.

SUMMARY OF THE INVENTION

The present invention has been achieved in consideration of the above-described problem, and enables to provide an ultrasonic motor for linear driving which suppresses a vibration impediment caused by a flection deformation of a flexible substrate.

In order to solve the above-described problem, according to the present invention, there is provided a driving device comprising a vibrating plate including a substantially rectangular flat plate portion and projecting portions provided on the flat plate portion, a piezoelectric element fixed on the vibrating plate and configured to produce a high-frequency vibration, a flexible substrate fixed on the piezoelectric element and configured to supply power to the piezoelectric element, a holding member configured to hold the vibrating plate, a press member configured to bias the vibrating plate, and a friction member that the vibrating plate biased by the press member contacts, wherein the vibrating plate moves relative to the friction member according to the high-frequency vibration of the piezoelectric element, the flexible substrate comprises a first fixing portion fixed to the piezoelectric element, a second fixing portion fixed to the holding member, and a bending portion configured to make a flection deformation along with a movement of the vibrating plate, and the second fixing portion is provided between the first fixing portion and the bending portion.

According to the present invention, it is possible to suppress a vibration impediment caused by a flection deformation of a flexible substrate and achieve improvement of a driving efficiency. Further features of the present invention will become apparent from the following description of exemplary embodiments with reference to the attached drawings.

BRIEF DESCRIPTION OF THE DRAWINGS

FIGS. 1A, 1B, 1C, 1D and 1E are diagrams showing a basic composition according to the present invention, in which FIG. 1A is a plan view, FIG. 1B is a front view, FIGS. 1C and 1D are side views, and FIG. 1E is a bottom view.

FIGS. 2A and 2B are diagrams showing a feed means of the basic composition according to the present invention, in which FIG. 2A is a diagram showing part of the composition of a flexible substrate 3 configured to supply power, and FIG. 2B is a plan view showing a state in which the flexible substrate 3 is fixed.

FIGS. 3A, 3B and 3C are diagrams showing a holding method of the basic composition according to the present invention, in which FIG. 3A is a plan view, FIG. 3B is a bottom view, and FIG. 3C is a sectional view.

FIGS. 4A, 4B and 4C are diagrams showing a holding method of the basic composition according to the present invention, in which FIG. 4A is a bottom view, FIG. 4B is a front view, and FIG. 4C is a sectional view.

FIGS. 5A, 5B and 5C are diagrams showing the composition of a linear driving device 30 of the basic composition according to the present invention, in which FIG. 5A is a front view, FIG. 5B is a bottom view, and FIG. 5C is a sectional view.

FIG. 6A is a timing chart showing AC voltages applied to an ultrasonic motor of the basic composition according to the present invention.

FIG. 6B is a diagram showing a vibration state in a front view.

FIGS. 6C and 6D are diagrams showing a vibration state in side view.

FIGS. 7A and 7B are diagrams showing a deformation of a flexible substrate 3 according to a related art, in which FIG. 7A is a plan view, and FIG. 7B is a bottom view.

FIGS. 8A and 8B are diagrams showing a deformation of the flexible substrate 3 according to the related art, in which FIG. 8A is a front view, and FIG. 8B is a sectional view.

FIGS. 10A and 10B are diagrams showing a fixing method of a flexible substrate 3 according to the first embodiment, in which FIG. 10A is a bottom view, and FIG. 10B is a front view.

FIGS. 13A and 13B are diagrams showing a fixing method of a flexible substrate 3 according to the second embodiment, in which FIG. 13A is a bottom view, and FIG. 13B is a front view.

FIGS. 15A and 15B are diagrams showing a modification of the second embodiment, in which FIG. 15A is a bottom view, and FIG. 15B is a sectional view.

FIGS. 16A and 16B are diagrams showing a fixing method of a flexible substrate 3 according to the third embodiment, in which FIG. 16A is a bottom view, and FIG. 16B is a front view.

DESCRIPTION OF THE EMBODIMENTS

Figure 1A:
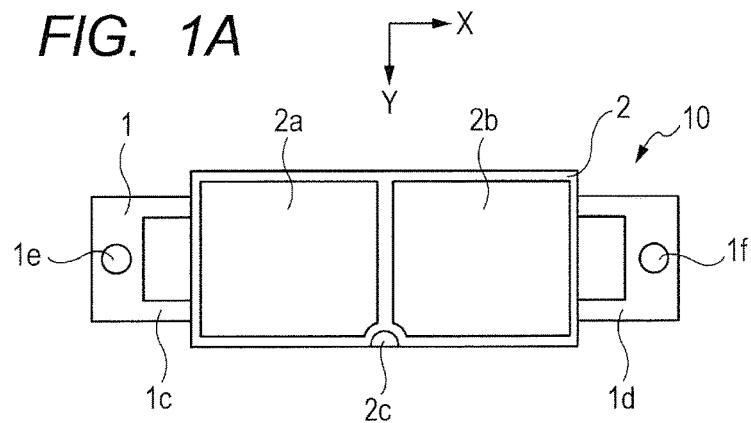

Preferred embodiments of the present invention will now be described in detail in accordance with the accompanying drawings.

A related art to understand the present invention and preferred embodiments to implement the present invention will be described below in accordance with the accompanying drawings. Note that the same reference numerals denote the same members throughout the drawings.

(Basic Arrangement of Present Invention)

Figures 1B, 1C, 1D:
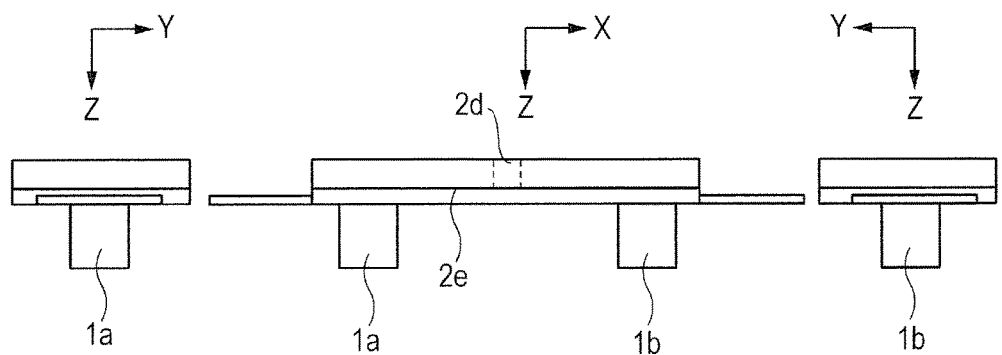
Figure 1E:
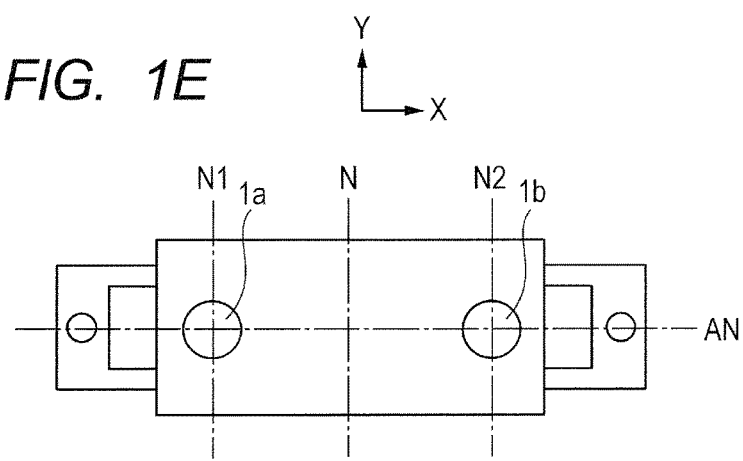

The basic arrangement of an ultrasonic motor 10 according to the present invention will be described with reference to FIGS. 1A to 1E. FIG. 1A is a plan view, FIG. 1B is a front view, FIGS. 1C and 1D are side views, and FIG. 1E is a bottom view. Referring to FIGS. 1A to 1E, a vibrating plate 1 includes a rectangular flat plate portion, and projecting portions 1a and 1b provided on the flat plate portion. The projecting portions 1a and 1b may integrally be formed with the flat plate portion by drawing, or separate members may be fixed to the flat plate portion by adhesion. A piezoelectric element 2 that produces a high-frequency vibration is fixed to the vibrating plate 1. The piezoelectric element 2 includes two regions 2a and 2b that are polarized in the same direction. The region 2a is assigned to an α phase, and the region 2b is assigned to a β phase. The piezoelectric element 2 also includes an unpolarized region 2c. The region 2c is an electrode used as ground whose conduction is attained from a full-scale electrode on a back surface 2e of the piezoelectric element 2 via an electrode in a region of a side surface 2d shown in FIG. 1B.

The short side portions of the rectangular surface of the vibrating plate 1 are respectively provided with connection portions 1c and 1d that move in synchronism with the vibrating plate 1 and are directly or indirectly connected to a second holding member 5 (to be described later). The connection portions 1c and 1d have a shape that hardly impedes a vibration because they are provided at portions with little displacement in the vibration of the vibrating plate 1 and the piezoelectric element 2 and have a sufficiently low rigidity. Hence, the connection portions 1c and 1d hardly affect the vibration of the vibrating plate 1 and the piezoelectric element 2. In addition, the connection portion 1c has a fixing hole 1e, and the connection portion 1d has a fixing hole 1f. In FIG. 1E, an antinode AN of the first-order natural vibration mode of a bending vibration in the short side direction and nodes N1, N, and N2 of the second-order natural vibration mode of a bending vibration in the long side direction (to be described later) are indicated by alternate long and short dashed lines. The long side direction of the vibrating plate 1 will be defined as an X direction, and the short side direction will be defined as a Y direction. In addition, the thickness direction of the almost rectangular surface of the vibrating plate 1 will be defined as a Z direction. Out of the Z direction, the direction from the vibrating plate 1 to a friction member 7 (to be described later) will be defined as a +Z direction, and the direction from the friction member 7 (to be described later) to the vibrating plate 1 will be defined as a −Z direction.

Figure 2A:
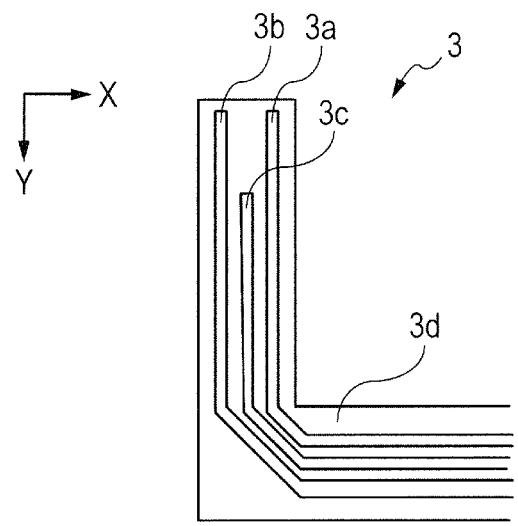
Figure 2B:
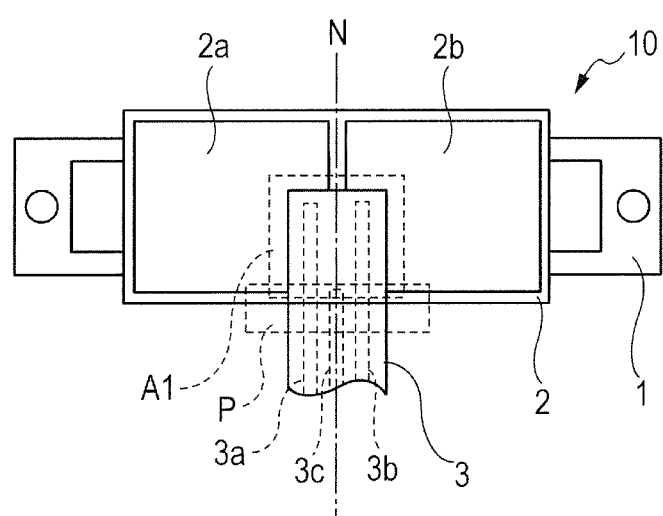

FIGS. 2A and 2B show a feed means for supplying power to the piezoelectric element 2. FIG. 2A is a diagram showing part of the composition of a flexible substrate 3 configured to supply power, and FIG. 2B is a plan view showing a state in which the flexible substrate 3 is fixed to the piezoelectric element 2. In the flexible substrate 3, electrodes 3a, 3b, and 3c are provided on a base substrate 3d, as shown in FIG. 2A. In the flexible substrate 3, the electrodes 3a, 3b, and 3c are electrically connected to the regions 2a, 2b, and 2c of the piezoelectric element 2, respectively, as shown in FIG. 2B. In addition, the flexible substrate 3 is fixed at a first fixing portion A1 of the piezoelectric element 2, and applies AC voltages generated by an external power supply (not shown) to the piezoelectric element 2.

A position P at which the flexible substrate 3 is extended and led from the first fixing portion A1 is a position corresponding to the node (on the alternate long and short dashed line N in FIG. 2B) of the second-order natural vibration mode of the bending vibration in the long side direction (to be described later). Directions in which the flexible substrate 3 extends from the first fixing portion A1 are the X direction that is the moving direction of the vibrating plate 1 and the Y direction that is perpendicular to the Z direction that is a press direction in which the vibrating plate 1 is pressed against the friction member 7 (to be described later). Note that in the remaining drawings, the electrodes 3a, 3b, and 3c of the flexible substrate 3 are not illustrated for the sake of simplicity. As described above, the ultrasonic motor 10 consists of the vibrating plate 1, the piezoelectric element 2, and the flexible substrate 3.

Figure 3A:
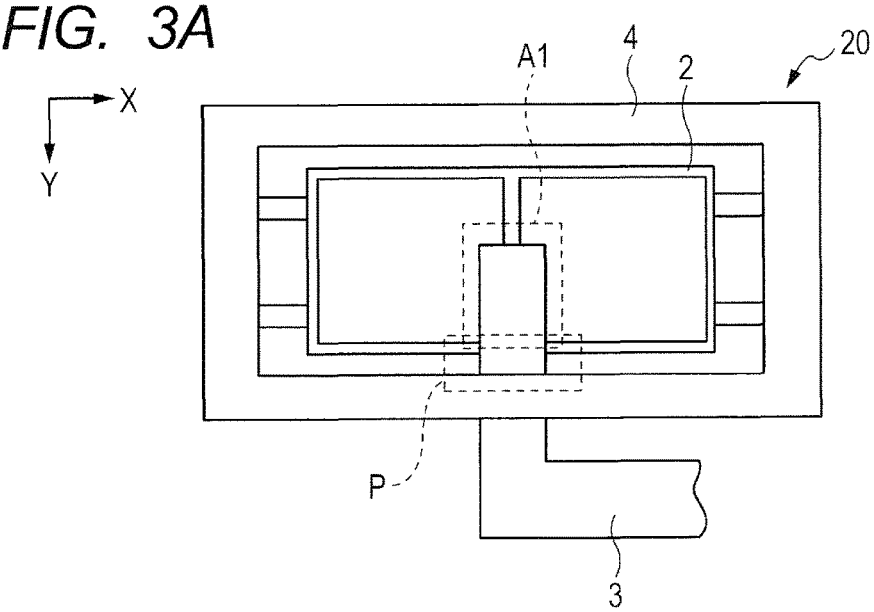
Figure 3B:
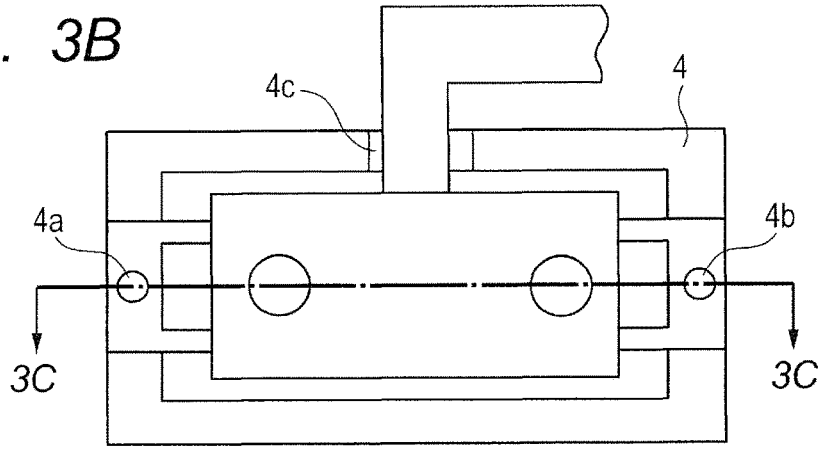
Figure 3C:
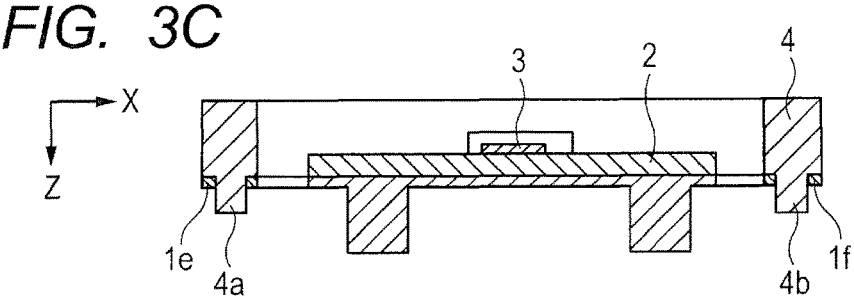

A holding method of the ultrasonic motor 10 will be described next. FIGS. 3A to 3C show a holding method of the ultrasonic motor 10. FIG. 3A is a plan view, FIG. 3B is a bottom view, and FIG. 3C is a sectional view taken along a section line 3C-3C in FIG. 3B. A first holding member 4 includes two fixed shafts 4a and 4b projecting in the Z direction. The fixed shafts 4a and 4b are fitted in the fixing holes 1e and 1f of the vibrating plate 1, respectively, thereby fixing the ultrasonic motor 10 in the first holding member 4. The flexible substrate 3 is fixed to the piezoelectric element 2 at the first fixing portion A1, passes through the position P and notch 4c of the first holding member 4, and is led in the Y direction. In addition, after extending out of the projection region of the first holding member 4 in FIG. 3A, the flexible substrate 3 bends almost at a right angle, and extends in the X direction that is the moving direction of the vibrating plate 1.

Figure 4A:
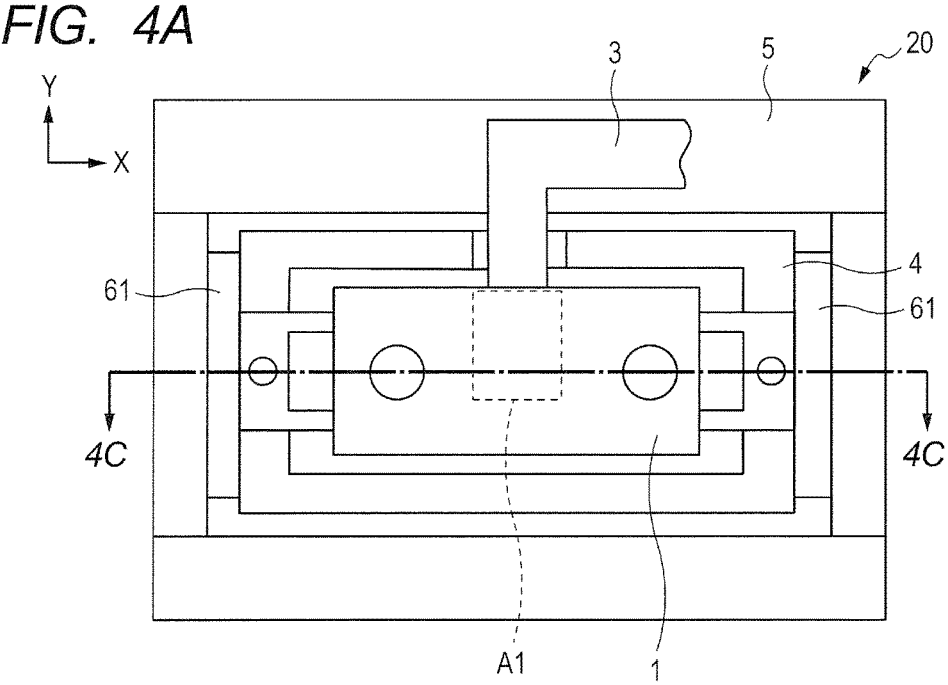
Figure 4B:
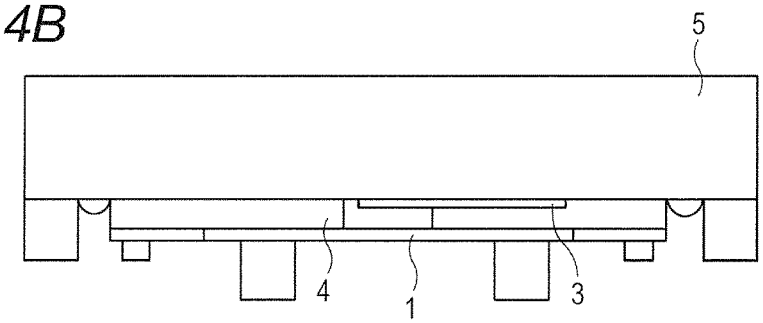
Figure 4C:
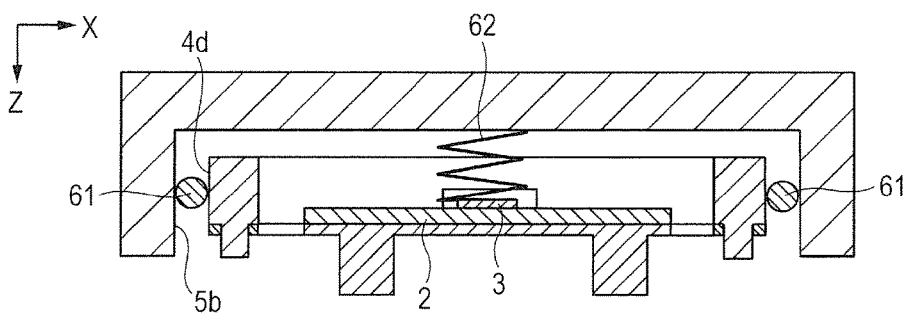

FIGS. 4A to 4C show a holding method of the first holding member 4 in which the ultrasonic motor 10 is fixed, and a pressing mechanism biases the vibrating plate 1. FIG. 4A is a bottom view, FIG. 4B is a front view, and FIG. 4C is a sectional view taken along a section line 4C-4C in FIG. 4A. The ultrasonic motor 10 fixed to the first holding member 4 includes the second holding member 5. As shown in FIG. 4C, in the second holding member 5, a roller 61 can roll between a roller receiving surface 4d on the side of the first holding member 4 and a roller receiving surface 5b on the side of the second holding member 5. That is, the first holding member 4 is held such that the movement in the X direction that is the moving direction of the vibrating plate 1 with respect to the second holding member 5 is regulated by the rollers 61, and the movement in the Z direction that is the press direction in which the vibrating plate 1 is pressed against the friction member 7 (to be described later) is not regulated. In addition, a press spring 62 that is a press member is provided between the second holding member 5 and the vibrating plate 1. The upper end of the press spring 62 acts on the second holding member 5, and the lower end acts on the piezoelectric element 2 and the flexible substrate 3. The vibrating plate 1 contacts the friction member 7 (to be described later) while being biased by the biasing force of the press spring 62. With the rollers 61, the first holding member 4 is held by the second holding member 5. The press spring 62 biases the ultrasonic motor 10.

Accordingly, the vibrating plate 1 can move in the Z direction in synchronism with the first holding member 4, and can also move in the moving direction of the ultrasonic motor 10 without backlash caused by fitting gap. When the ultrasonic motor 10 moves relative to the friction member 7 (to be described later) by the high-frequency vibration of the vibrating plate 1, the ultrasonic motor 10, the first holding member 4, and the second holding member 5 move synchronously. The flexible substrate 3 extends in the Y direction from the first fixing portion A1 on the piezoelectric element 2, as shown in FIG. 4A. Then, the flexible substrate 3 bends and extends in the X direction as the moving direction on the second holding member 5. A driving unit 20 consists of the ultrasonic motor 10, the first holding member 4, the second holding member 5, and the like.

Figure 5A:
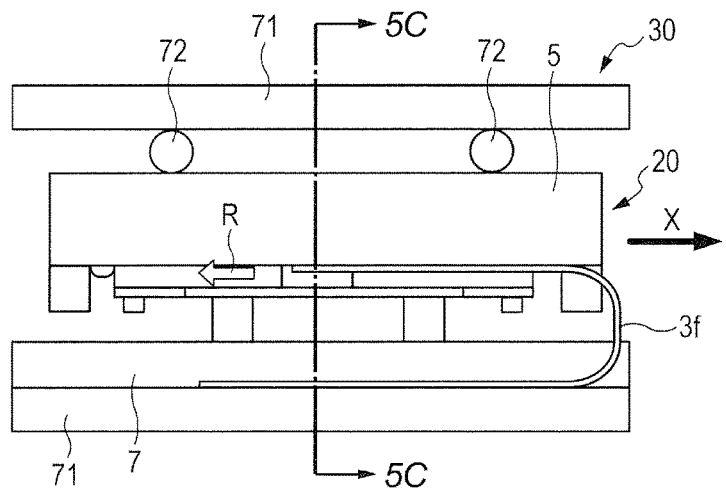
Figure 5B:
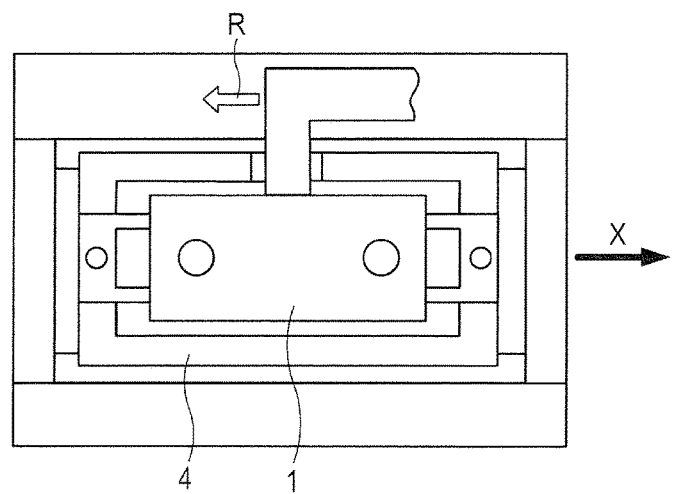
Figure 5C:
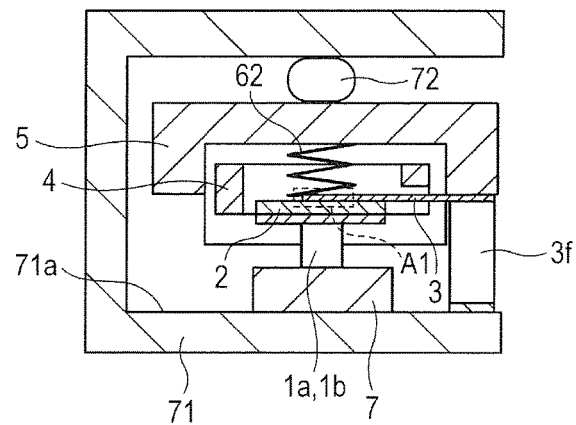

FIGS. 5A to 5C show the composition of a linear driving device 30. FIG. 5A is a front view, FIG. 5B is a bottom view, and FIG. 5C is a sectional view taken along a section line 5C-5C in FIG. 5A. Note that in FIG. 5B, the friction member 7 and a base member 71 are not illustrated. Along with the movement of the driving unit 20, the flexible substrate 3 makes a flection deformation, and a bending portion 3f moves. Since the driving unit 20 moves while causing the flexible substrate 3 fixed to the base member 71 to make the flection deformation, a reaction force R is generated in the flexible substrate 3 in a direction indicated by an arrow in each of FIGS. 5A and 5B.

The friction member 7 is fixed on a bottom surface 71a of the base member 71. The projecting portions 1a and 1b of the vibrating plate 1 contact the friction member 7 while being pressed against it. The ultrasonic motor 10 moves relative to the friction member 7 by the high-frequency vibration of the vibrating plate 1, and the first holding member 4 and the second holding member 5 move in synchronism with the ultrasonic motor 10. Rolling rollers 72 are provided between the base member 71 and the second holding member 5 to reduce the slide resistance at the time of driving. The rolling rollers 72 are provided to reduce the slide resistance at the time of driving, and a rolling mechanism including a rolling ball and a ball groove or the like may be used instead.

The driving unit 20 formed from the ultrasonic motor 10, the first holding member 4 and the second holding member 5 can move in the X direction relative to the base member 71 by the high-frequency vibration of the vibrating plate 1. The projecting portions 1a and 1b of the vibrating plate 1 contact the friction member 7 while being pressed against it by the press force of the press spring 62. The driving unit 20 can move in the X direction by a driving force generated by elliptic motions as indicated by an arrow in each of FIGS. 6B, 9C, and 9D (to be described later). The basic composition of the ultrasonic motor 10 according to the present invention has been described above.

Elliptic motions generated in the projecting portions 1a and 1b of the vibrating plate 1 by the high-frequency vibration of the piezoelectric element 2 of the ultrasonic motor 10 will be described next with reference to FIGS. 6A to 6D. The high-frequency vibration of the piezoelectric element 2 excites a natural vibration mode specific to the vibrating plate 1. That is, the high-frequency vibration of the piezoelectric element 2 excites, in the vibrating plate 1, the first-order natural vibration mode of the bending vibration in the short side direction (Y direction) of the vibrating plate 1 and the second-order natural vibration mode of the bending vibration in the long side direction (X direction) of the vibrating plate 1. Referring to FIG. 1E, the projecting portions 1a and 1b are provided near the antinode AN of the first-order natural vibration mode of the bending vibration in the short side direction and near the nodes N1 and N2 of the second-order natural vibration mode of the bending vibration in the long side direction. Referring to FIG. 1A, a high-frequency vibration can be generated by causing the above-described feed means to apply AC voltages having a phase difference that changes from +90° to +270° to the polarized region 2a (α phase) and region 2b (β phase) of the piezoelectric element 2.

FIGS. 6A to 6D show a vibration in a case in which AC voltages are applied by delaying the phase for the β phase by about +90° with respect to that for the α phase. FIG. 6A shows changes in the AC voltages applied to the α phase and β phase of the piezoelectric element 2. FIGS. 1B to 1D correspond to FIGS. 6B to 6D, respectively. The vibration states of the projecting portions 1a and 1b at times T1 to T4 shown in FIG. 6A are indicated by P1 to P4. The piezoelectric element 2 and the connection portions 1c and 1d are not illustrated in FIGS. 6B to 6D for the sake of simplicity.

At times (T2 and T4) when voltages of the same sign are applied to the α phase and the β phase, the α phase and the β phase stretch/contract in the same way. Accordingly, the first-order natural vibration mode of the bending vibration in the short side direction is excited, and the Z-direction amplitudes of the distal ends of the projecting portions 1a and 1b are maximized (displacement z in P2 and P4 of FIG. 6C). On the other hand, at times (T1 and T3) when voltages of different signs are applied to the α phase and the β phase, the α phase and the β phase stretch/contract in opposite directions. Accordingly, the second-order natural vibration mode of the bending vibration in the long side direction is excited, and the X-direction amplitudes of the distal ends of the projecting portions 1a and 1b are maximized (displacement x in P1 and P3 of FIG. 6B). When the AC voltages are applied by delaying the phase for the β phase by about +90° with respect to that for the α phase, an elliptic motion is generated at each of the distal ends of the projecting portions 1a and 1b.

The projecting portions 1a and 1b contact the friction member 7. The vibrating plate 1 can obtain a thrust by the friction between the friction member 7 and the projecting portions 1a and 1b generated by the elliptic motions of the projecting portions 1a and 1b and relatively move in the X direction, as shown in FIG. 6B. When the AC voltages are applied by delaying the phase for the β phase by about +270° with respect to that for the α phase, elliptic motions in the reverse direction occur. Hence, the vibrating plate 1 can relatively move in the direction opposite to the X direction shown in FIG. 6B by the friction to the friction member 7 generated by the elliptic motions of the projecting portions 1a and 1b.

As described above, in the ultrasonic motor 10 according to the first embodiment, the vibrating plate 1 can move relative to the friction member 7 by the elliptic motions generated in the projecting portions 1a and 1b by the high-frequency vibration.

RELATED ART

Figure 7A:
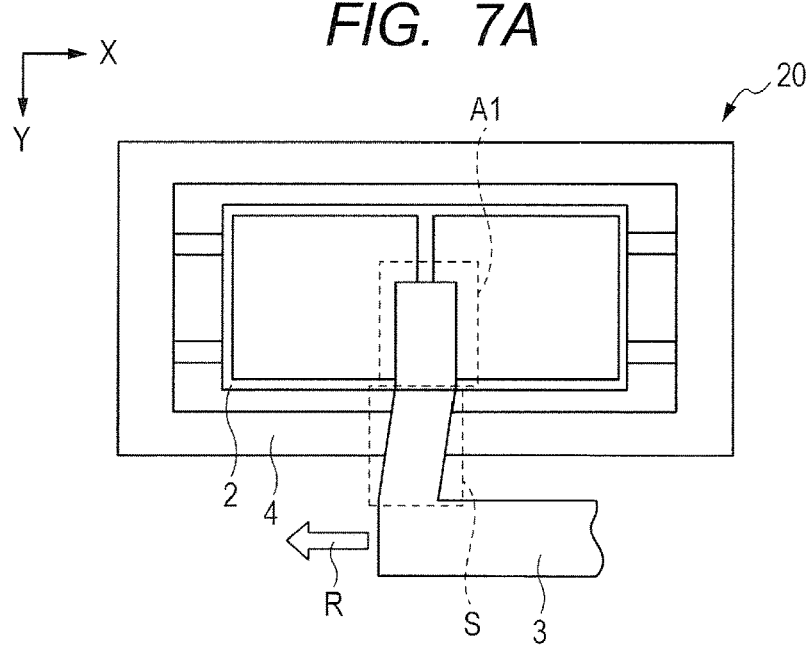
Figure 7B:
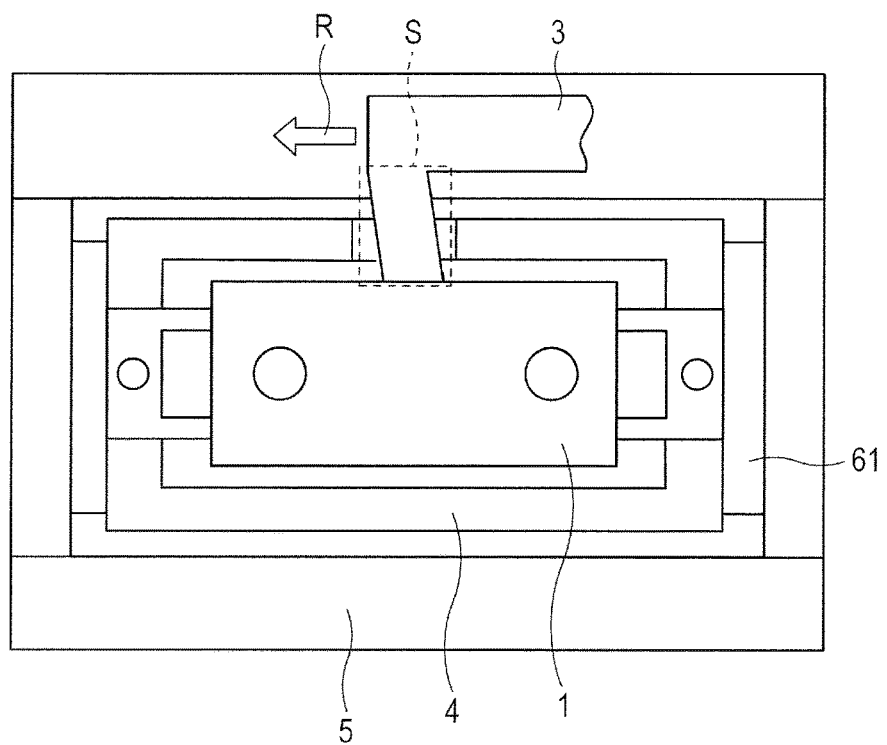
Figure 8A:
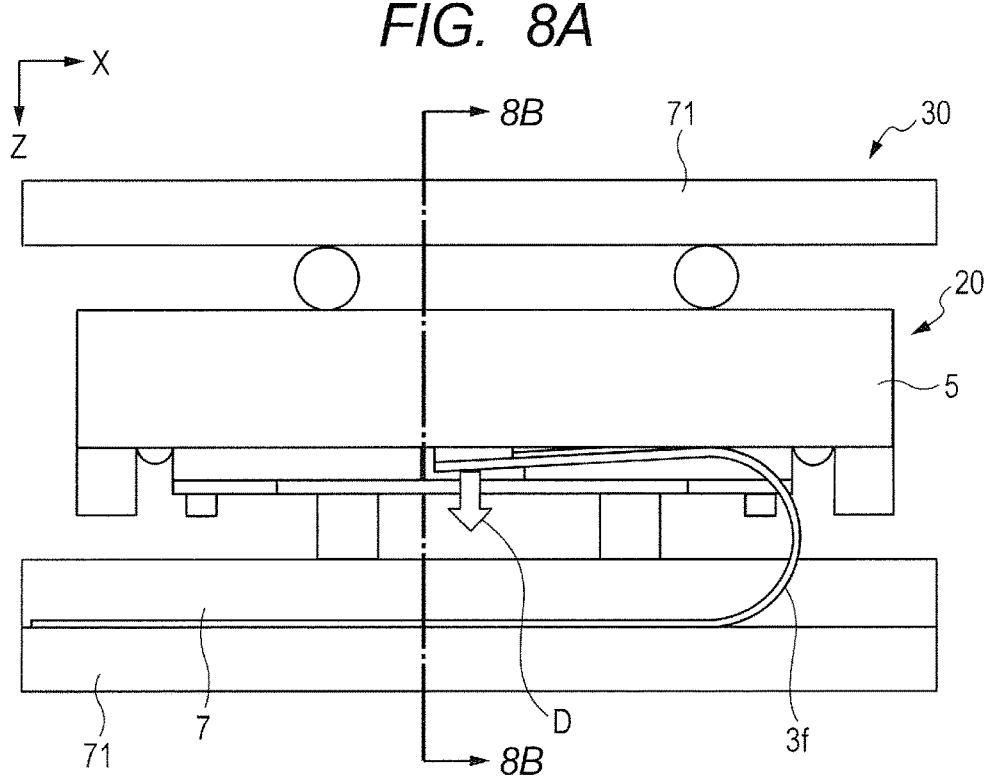
Figure 8B:
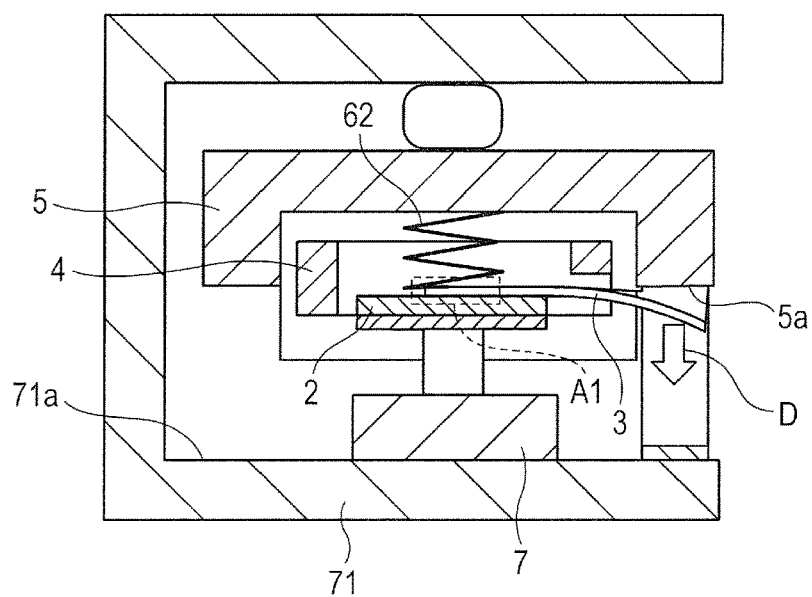

An ultrasonic motor according to a related art will be described next. FIGS. 7A and 7B and FIGS. 8A and 8B show a problem in the related art, that is, the deformation of the flexible substrate 3. FIG. 7A is a plan view of the driving unit 20, and FIG. 7B is a bottom view of the driving unit 20. The second holding member 5 and the rollers 61 are not illustrated in FIG. 7A. FIG. 8A is a front view of the linear driving device 30, and FIG. 8B is a sectional view taken along a section line 8B-8B in FIG. 8A.

In the related art, the flexible substrate 3 moves in the X direction relative to the second holding member 5 by the reaction force R generated in a direction indicated by an arrow in FIG. 7B by the flection deformation of the flexible substrate 3 according to the movement of the driving unit 20. A portion of the flexible substrate 3 represented by a region S thus deforms, and a load is generated on the piezoelectric element 2 that fixes the flexible substrate 3 at the first fixing portion A1.

FIG. 8A shows that the flexible substrate 3 deforms in a direction D indicated by an arrow so as to separate from the second holding member 5 due to a reaction force generated by the flection deformation of the flexible substrate 3 according to the movement of the driving unit 20. Along with the deformation, the piezoelectric element 2 on which the flexible substrate 3 is fixed at the first fixing portion A1 is pulled in the Z direction, and a load is thus generated on the piezoelectric element 2. A load is probably generated on the piezoelectric element 2 in other cases than the case in which the flexible substrate 3 deforms, and a load is generated on the piezoelectric element 2 along with the movement of the driving unit 20.

Figure 9A:
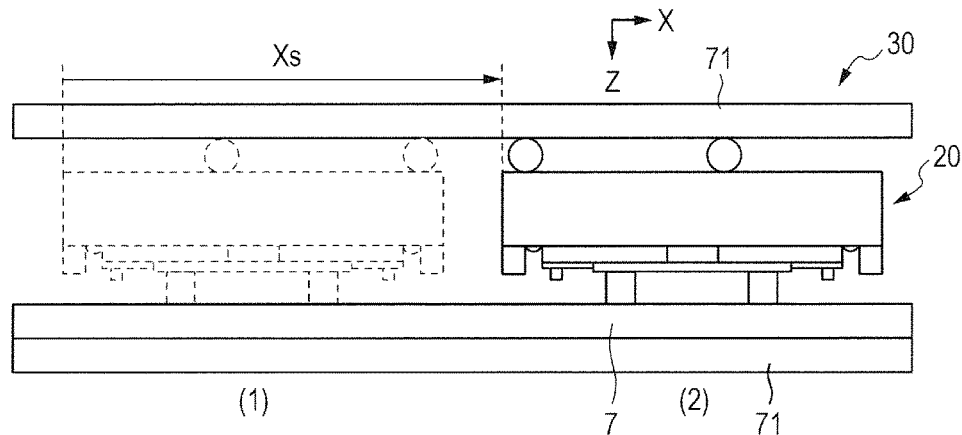
FIG. 9A is a diagram showing the movement of a linear driving device 30 according to the related art.
Figure 9B:
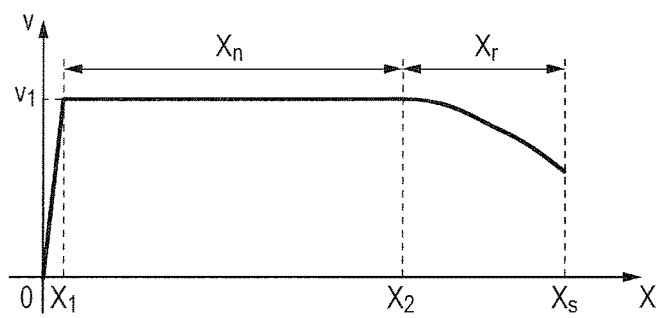
FIG. 9B is a graph showing a speed characteristic.

The speed characteristic of the ultrasonic motor 10 according to the related art will be described next with reference to FIGS. 9A to 9D. FIG. 9A is a view showing the movement of the driving unit 20 from a driving end position (indicated by a dotted line in FIG. 9A) to another driving end position (indicated by a solid line in FIG. 9A). Here, a driving stroke when the driving unit 20 is driven from the driving end position (1) to the driving end position (2) is $X_s$. When the driving unit 20 moves, voltages with a predetermined frequency and phase difference are input to the ultrasonic motor 10. FIG. 9B shows the speed characteristic of the driven ultrasonic motor 10 with respect to an input. The abscissa in FIG. 9B represents a position X of the driving unit 20, and the ordinate represents a moving speed v of the driving unit 20.

Figure 9C:
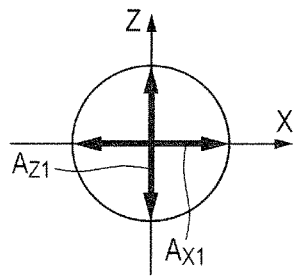
FIGS. 9C and 9D are graphs showing elliptic motions of the projecting portions of a vibrating plate 1.
Figure 9D:
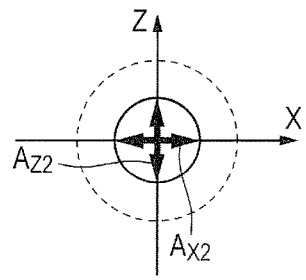

FIG. 9C shows the elliptic motions of the projecting portions 1a and 1b in a region $X_n$ shown in FIG. 9B. FIG. 9D shows the elliptic motions of the projecting portions 1a and 1b in a region $X_r$ shown in FIG. 9B. In the elliptic motions generated at the distal ends of the projecting portions 1a and 1b, the amplitude in the moving direction of the vibrating plate 1 is represented by $A_X$, and the amplitude in the press direction in which the vibrating plate 1 is pressed against the friction member 7 is represented by $A_Z$. Note that in FIGS. 9C and 9D, each of the elliptic motions at the distal ends of the projecting portions 1a and 1b is illustrated as a circular motion for the sake of simplicity.

The driving unit 20 accelerates in a predetermined region where the position X changes from 0 to $X_1$. The moving speed v of the driving unit 20 is a moving speed $v_1$ at a predetermined frequency and phase difference. The region $X_n$ from $X_1$ to $X_2$ is a region where no load on the piezoelectric element 2 exists. On the other hand, the region $X_r$ from $X_2$ to $X_s$ is a region where a load is generated on the piezoelectric element 2 due to the deformation of the flexible substrate 3, as shown in FIG. 7A or 8A.

In the region $X_r$, since the vibration is impeded by the load generated on the piezoelectric element 2 due to the deformation of the flexible substrate 3, the elliptic motion in the region $X_r$ is smaller than the elliptic motion (indicated by the dotted line in FIG. 9D) in the region $X_n$, as shown in FIG. 9D. That is, amplitudes $A_{X2}$ and $A_{Z2}$ of the projecting portions 1a and 1b in the region $X_r$ are smaller than amplitudes $A_{X1}$ and $A_{Z1}$ in the region $X_n$. The amplitude $A_X$ of each of the elliptic motions of the projecting portions 1a and 1b in the moving direction contributes to the moving speed v of the vibrating plate 1. For this reason, in the region $X_r$, if the vibration is impeded, and the amplitude $A_Z$ in the moving direction becomes small in the region $X_r$, as indicated by the amplitude $A_{X2}$ shown in FIG. 9D, the moving speed v of the vibrating plate 1 decreases, as shown in FIG. 9B.

As described above, the related art has the problem that the flection deformation of the flexible substrate 3 generates a load on the piezoelectric element 2 that produces a high-frequency vibration, the high-frequency vibration of the piezoelectric element 2 needed to drive the driving unit 20 is thus impeded, and the moving speed, that is, the driving efficiency of the driving unit 20 lowers.

First Embodiment

Figure 10A:
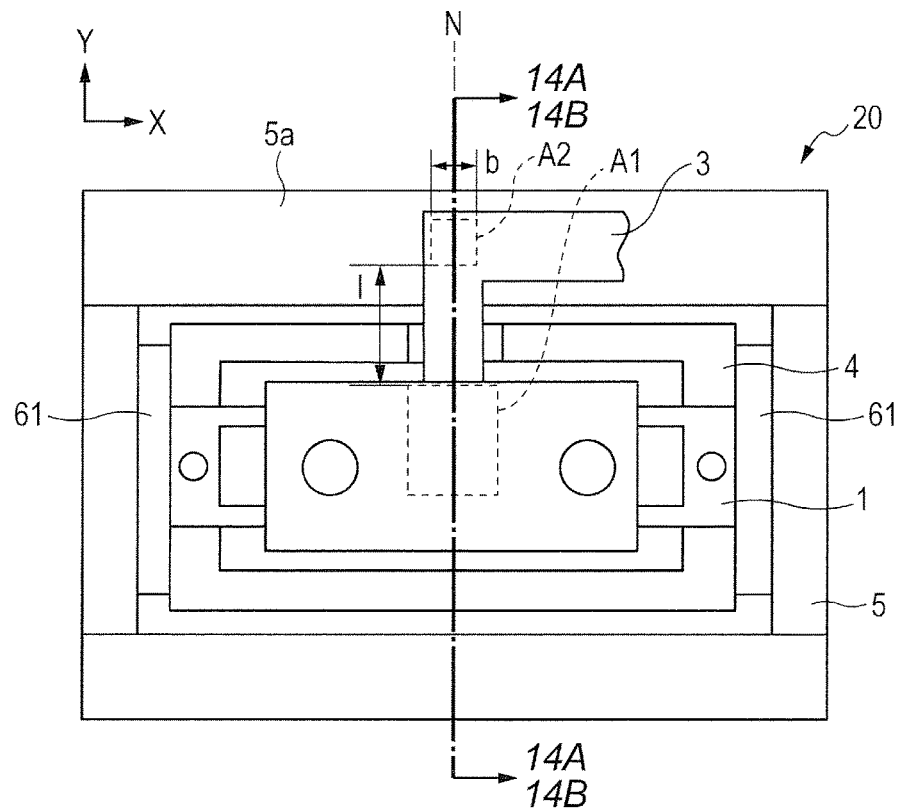
Figure 10B:
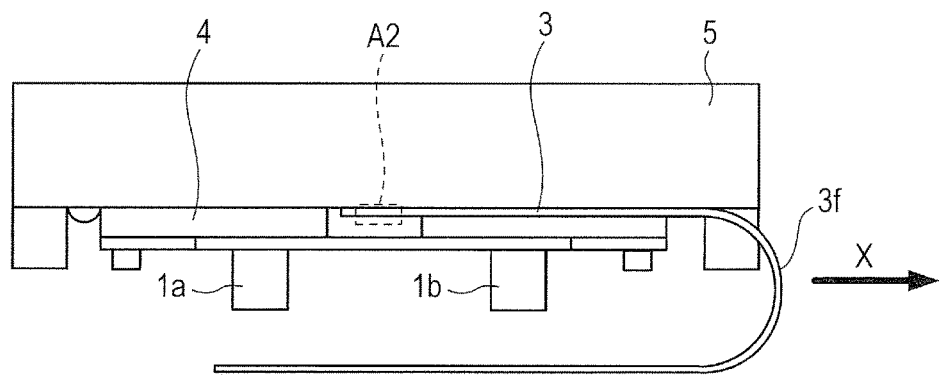

The first embodiment will be described next with reference to FIGS. 10A and 10B. FIG. 10A is a bottom view showing a fixing method of a flexible substrate 3 according to the first embodiment, and FIG. 10B is a front view. The main components are the same as those shown in FIG. 4A. The flexible substrate 3 is fixed on a fixing surface 5a of a second holding member 5 at a second fixing portion A2 by an adhesion means such as a double-sided adhesive tape. At this time, the flexible substrate 3 is fixed to the second holding member 5 on an extension line (alternate long and short dashed line N) in a direction in which the flexible substrate 3 is extended from a first fixing portion A1 on a piezoelectric element 2. That is, the second fixing portion A2 is provided on the extension line (N) in the direction in which the flexible substrate 3 is extended from the first fixing portion A1. The flexible substrate 3 is fixed at the second fixing portion A2 and then extended in the X direction that is the moving direction. Note that the position of the extension line (N) shown in FIG. 10A is the position of a node of the second-order natural vibration mode of a bending vibration in the long side direction.

The second fixing portion A2 at which the flexible substrate 3 is fixed to the second holding member 5 is located between the first fixing portion A1 and a bending portion 3f. That is, the flexible substrate 3 is fixed at the second fixing portion A2 using a double-sided adhesive tape, and a reaction force generated by a flection deformation of the flexible substrate 3 according to the movement of a driving unit 20 is received by the second fixing portion A2. Since the second holding member 5 is a member having a sufficient rigidity, the second fixing portion A2 of the flexible substrate 3 never moves relative to a fixing portion A1 of the piezoelectric element 2 due to the reaction force generated by the flection deformation of the flexible substrate 3. That is, because the flexible substrate 3 does not deform in the region from the second fixing portion A2 to the first fixing portion A1, the load is not transmitted to the piezoelectric element 2.

Note that the flexible substrate 3 is extended from the second fixing portion A2 in the X direction that is the moving direction, and after that, bent and folded at the bending portion 3f, and then extended in a direction opposite to the X direction along a bottom surface 71a of the base member 71. The flexible substrate 3 is fixed by a fixing boss 71b (to be described later) on the bottom surface 71a of the base member 71.

Occurrence of an undesired vibration by the resonance phenomenon of the flexible substrate 3 will be described here. When the piezoelectric element 2 produces a high-frequency vibration, the vibration is transmitted to the flexible substrate 3 fixed to the piezoelectric element 2. At this time, since the flexible substrate 3 between the first fixing portion A1 on the piezoelectric element 2 and the second fixing portion A2 on the second holding member 5 vibrates in a two-end fixed beam state, a specific natural vibration mode exists. If the frequency of the high-frequency vibration of the piezoelectric element 2 matches the resonance frequency of the natural vibration mode of the flexible substrate 3, an undesired vibration is generated in the flexible substrate 3 due to a resonance phenomenon. This impedes the high-frequency vibration of the piezoelectric element 2, and generates an undesired sound.

Hence, the shape or size of the flexible substrate 3 is designed such that the frequency of the high-frequency vibration to be generated in the piezoelectric element 2 becomes different from the resonance frequency of the natural vibration mode of the flexible substrate 3 between the first fixing portion A1 on the piezoelectric element 2 and the second fixing portion A2 on the second holding member 5. For example, consider the resonance of the flexible substrate 3 between the first fixing portion A1 on the piezoelectric element 2 and the second fixing portion A2 on the second holding member 5 as the resonance of a flat plate having a length l and a width b, as shown in the bottom view of FIG. 10A. At this time, a resonance frequency f of the flat plate is given by $$f = \frac{\varepsilon}{2\pi\sqrt{\varepsilon_r}} \sqrt{\left(\frac{m\pi}{l}\right)^\varepsilon + \left(\frac{n\pi}{b}\right)^\varepsilon} \quad (1)$$

where $\varepsilon_r$ is the relative permittivity, and m and n are the vibration mode numbers in the lengthwise direction and widthwise direction, respectively. That is, the reciprocal of the length l contributes to the resonance frequency of the mth-order vibration mode in the lengthwise direction, and the reciprocal of the width b contributes to the resonance frequency of the nth-order vibration mode in the widthwise direction. Hence, if the vibration mode of the above-described undesired vibration is the vibration mode in the lengthwise direction, the resonance frequency of the undesired vibration is changed by adjusting the length l. If the vibration mode of the undesired vibration is the vibration mode in the widthwise direction, the resonance frequency of the undesired vibration is changed by adjusting the width b. More specifically, the length l can be adjusted by changing the position of the second fixing portion A2 in the Y direction, and the width b can be adjusted by changing the widthwise size of the flexible substrate 3. By adjusting the size of the flexible substrate 3 in this way, the resonance frequency of the undesired vibration can be adjusted and made different from the frequency of the high-frequency vibration of the piezoelectric element 2.

Figure 11A:
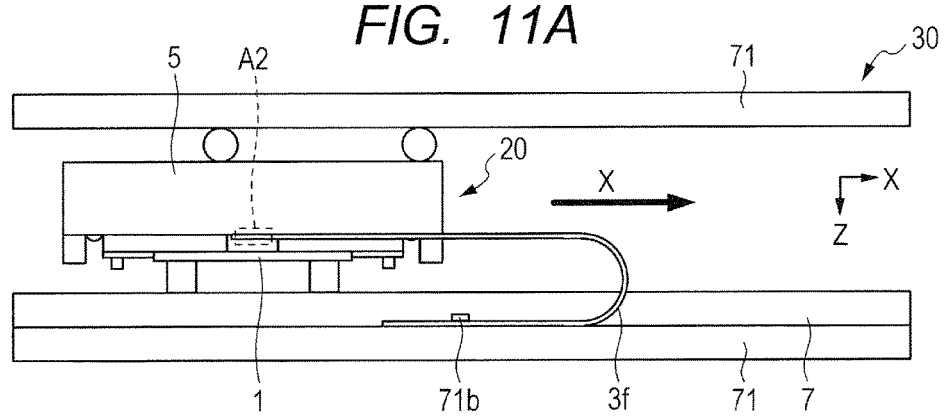
FIGS. 11A, 11B and 11C are diagrams showing the movement of a driving unit 20 of a linear driving device 30.
Figure 11B:
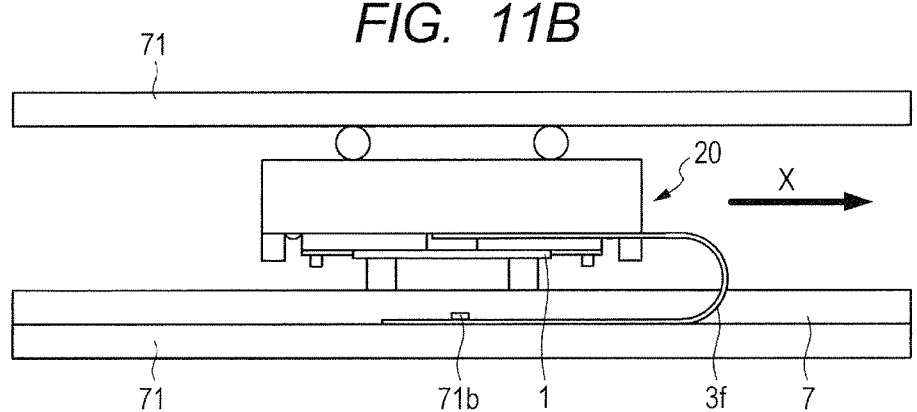
Figure 11C:
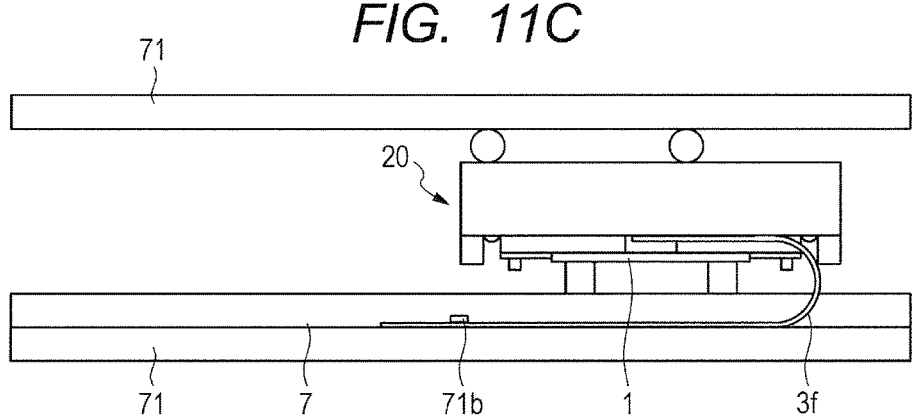

FIGS. 11A to 11C are diagrams showing the movement of the driving unit 20 in a linear driving device 30. FIG. 11A shows a case in which the driving unit 20 is located at the driving end starting position. FIG. 11B shows a case in which the driving unit 20 is located at the central position. FIG. 11C shows a case in which the driving unit 20 is located at the driving end terminating position. When moving in the X direction, the driving unit starts moving for the driving end starting position, passes through the intermediate position, and stops at the driving end terminating position. When moving in the direction opposite to the X direction, the driving unit 20 makes a movement reverse to the above-described movement. The flexible substrate 3 is fixed to the second holding member 5 by an adhesion means such as a double-sided adhesive tape. In addition, the flexible substrate 3 is extended from the second fixing portion A2 in the X direction folded at the bending portion 3f, after that, extended in a direction opposite to the X direction along the base member 71, and fixed on the base member 71 by the fixing boss 71b. Along with the movement of the driving unit 20, the bending portion 3f of the flexible substrate 3 moves while making a flection deformation. In the composition of the present invention in which the driving unit 20 moves relative to the fixed base member 71, power is supplied to the piezoelectric element 2 that is moved integrally with the driving unit 20 by the flexible substrate 3 including the bending portion 3f.

Figure 12:
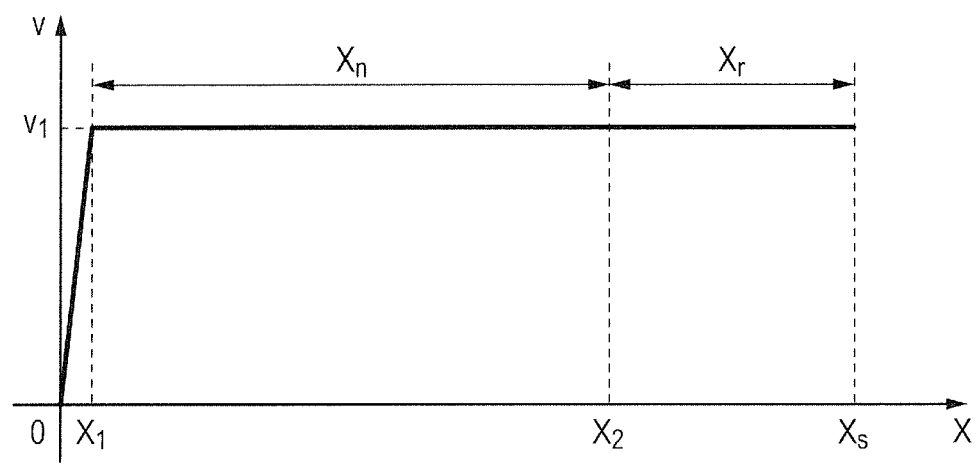
FIG. 12 is a graph showing the speed characteristic of an ultrasonic motor 10 according to the first embodiment.

FIG. 12 is a graph showing the speed characteristic of the linear driving device 30 using an ultrasonic motor 10 according to the first embodiment. The abscissa represents a position X of the driving unit 20, and the ordinate represents a moving speed v of the driving unit 20. The driving unit 20 accelerates in a predetermined region where the position X changes from 0 to $X_1$. The moving speed v of the driving unit 20 is a moving speed $v_1$ at a predetermined frequency and phase difference. In the first embodiment, the load caused by the flexible substrate 3 is not transmitted to the piezoelectric element 2 in a region $X_r$ where a load is generated on the piezoelectric element 2 in the related art (see FIG. 9B). For this reason, the high-frequency vibration of the piezoelectric element 2 is not impeded, and the driving unit 20 can move to $X_s$ at a predetermined moving speed $v_1$. In the first embodiment, since the high-frequency vibration of the piezoelectric element 2 is not impeded, the moving speed does not decrease as compared to the conventional composition in which the flexible substrate is not fixed to the second holding member 5. That is, the driving efficiency of the ultrasonic motor 10 improves.

As described above, in the ultrasonic motor 10 according to the first embodiment, since the flexible substrate 3 is fixed to the second holding member 5, the load caused by the flection deformation of the flexible substrate 3 is not transmitted to the piezoelectric element 2. It is therefore possible to attain the effect of suppressing vibration impediment caused by the flection deformation of the flexible substrate 3 and achieving improvement of the driving efficiency.

Note that in the first embodiment, an example in which the second fixing portion A2 is provided on the extension line (N) in the direction to extend from the first fixing portion A1 has been described. However, the second fixing portion A2 may be provided at a position that is not located on the extension line (N) in the direction to extend from the first fixing portion A1. The flexible substrate 3 is led from a position serving as a node (N1, N, or N2) of the second-order natural vibration mode of the bending vibration in the long side direction. Hence, when fixed to the second holding member 5 on the extension line (N) in the direction to extend from the first fixing portion A1, the flexible substrate 3 hardly causes an undesired vibration. However, if the second fixing portion A2 is provided at a position that is not located on the extension line (N) in the direction to extend but between the bending portion 3f and the first fixing portion A1, the load caused by the flection deformation of the flexible substrate 3 is not transmitted to the piezoelectric element 2, and therefore, the driving efficiency does not lower. Additionally, in the first embodiment, the method of fixing the flexible substrate 3 to the second holding member 5 by a double-sided adhesive tape has been described. However, the adhesion means for fixing is not limited to the double-sided adhesive tape.

Second Embodiment

The second embodiment of the present invention will be described below with reference to FIGS. 13A and 13B. In the first embodiment, the flexible substrate 3 is fixed to the second holding member 5 by a double-sided adhesive tape. In the second embodiment, however, a flexible substrate 3 is fixed to a second holding member 5 such that movements in the X and Z directions relative to the second holding member 5 are regulated, and a movement in the Y direction is not regulated. Note that the same reference numerals as in the first embodiment denote the same members. A description of the same portions as in the first embodiment will be omitted, and only portions different from the first embodiment will be described.

Figure 13A:
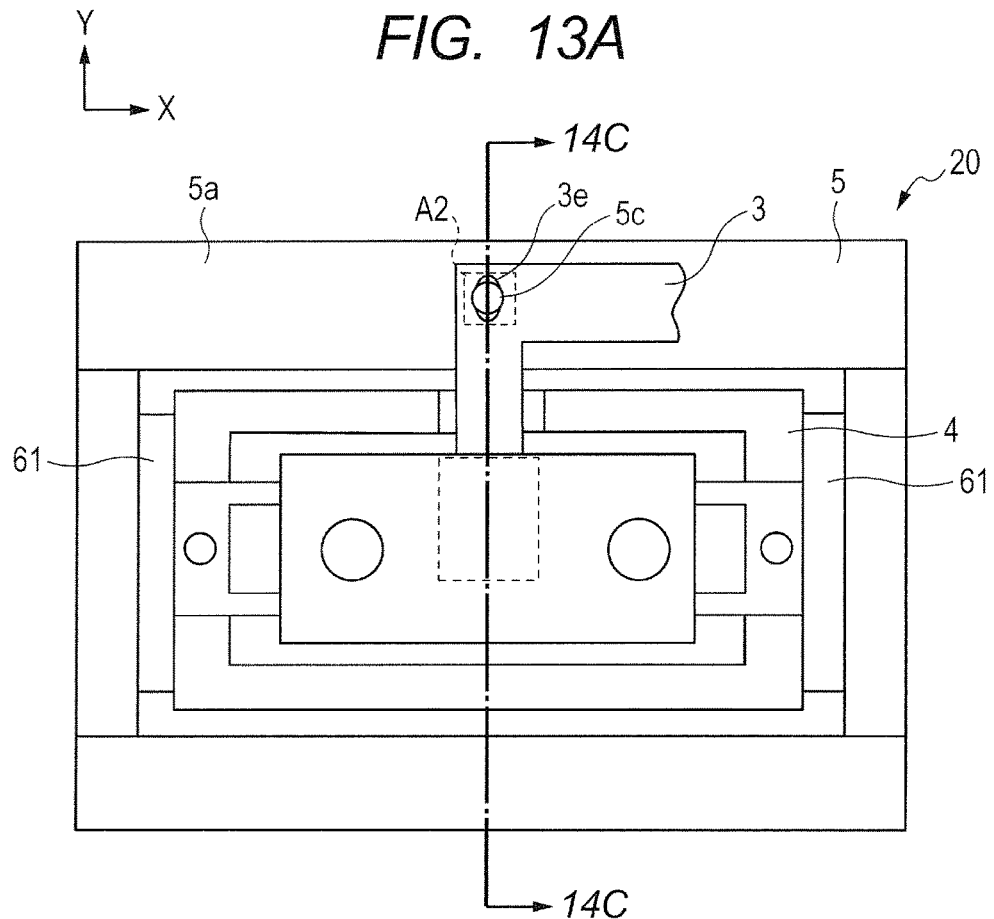
Figure 13B:
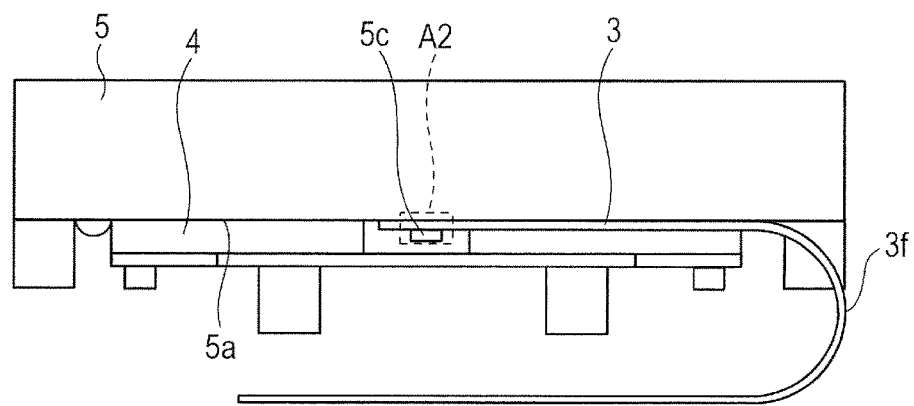

FIGS. 13A and 13B show a holding method of the flexible substrate 3 according to the second embodiment. FIG. 13A is a bottom view of a driving unit 20, and FIG. 13B is a front view of the driving unit 20. The flexible substrate 3 is fixed on a fixing surface 5a of the second holding member 5 at a second fixing portion A2 by fitting a fixing boss 5c (projection) provided on the second holding member 5 in a fixing hole 3e provided on the flexible substrate 3. The fixing hole 3e is a hole long in the Y direction. Hence, the flexible substrate 3 is fixed to the second holding member 5 such that movements in the X direction that is the moving direction of a vibrating plate 1 and in the Z direction that is the press direction of the vibrating plate 1 are regulated, and a movement in the Y direction that is a direction perpendicular to the X direction as the moving direction and the Z direction as the press direction is not regulated.

Figure 14A:
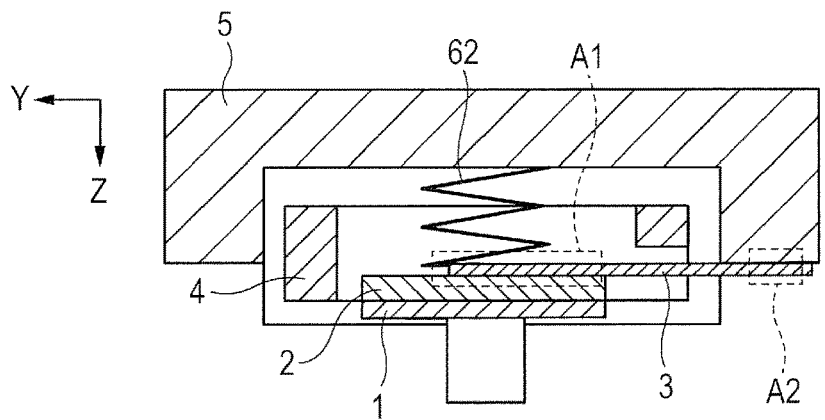
FIGS. 14A and 14B are sectional views of FIG. 10A.
Figure 14B:
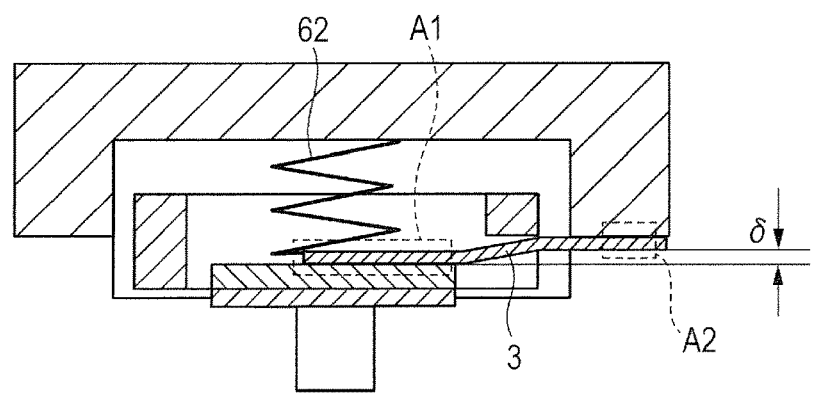
Figure 14C:
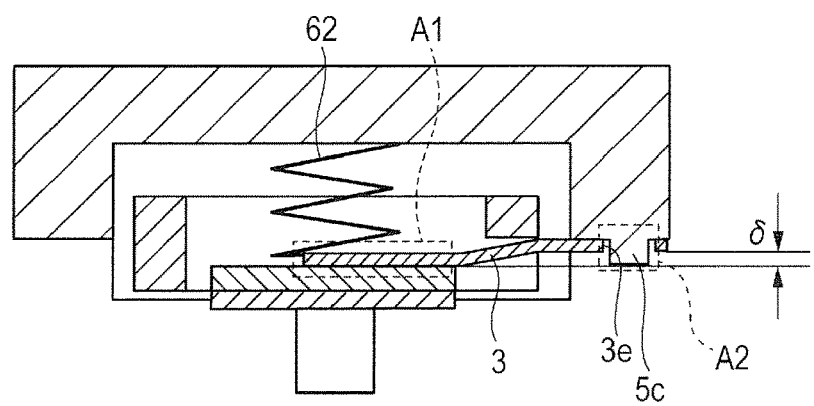
FIG. 14C is a sectional view of FIG. 13A.

The function and effect of the second embodiment will be described next with reference to FIGS. 14A to 14C. FIG. 14A shows a state in which the relative position of a first holding member 4 to the second holding member 5 has not changed. FIGS. 14B and 14C show a state in which the relative position of the first holding member 4 to the second holding member 5 has changed. FIGS. 14A and 14B are sectional views taken along section lines 14A-14A and 14B-14B in FIG. 10A of the first embodiment, respectively. FIG. 14C is a sectional view taken along a section line 14C-14C in FIG. 13A of the second embodiment.

In the composition in which the second holding member 5 holds the first holding member 4, a first fixing portion A1 and the second fixing portion A2 are configured to be flush with each other, and the flexible substrate 3 is fixed at the second fixing portion A2 by a double-sided adhesive tape (first embodiment), as shown in FIG. 14A. However, in some cases, the position of the first holding member 4 that holds the vibrating plate 1 and a piezoelectric element 2 changes relative to the second holding member 5 by a shift amount δ in the Z direction, as shown in FIG. 14B, due to accumulation of component tolerances and the like. If the shift amount δ is generated, a tensile load is generated between the first fixing portion A1 and the second fixing portion A2. Since the generated tensile load impedes the high-frequency vibration of the piezoelectric element 2, the driving efficiency lowers. That is, in the first embodiment, the driving efficiency lowers in some cases.

However, when the flexible substrate 3 is fixed to the second holding member 5 so as not to regulate the movement in the Y direction, as in the second embodiment, the flexible substrate 3 can move in the Y direction relative to the second holding member 5, as shown in FIG. 14C. For this reason, no tensile load is generated between the first fixing portion A1 and the second fixing portion A2. As a result, the high-frequency vibration of the piezoelectric element 2 is not impeded, and the effect of preventing the driving efficiency from lowering is obtained.

Figure 15A:
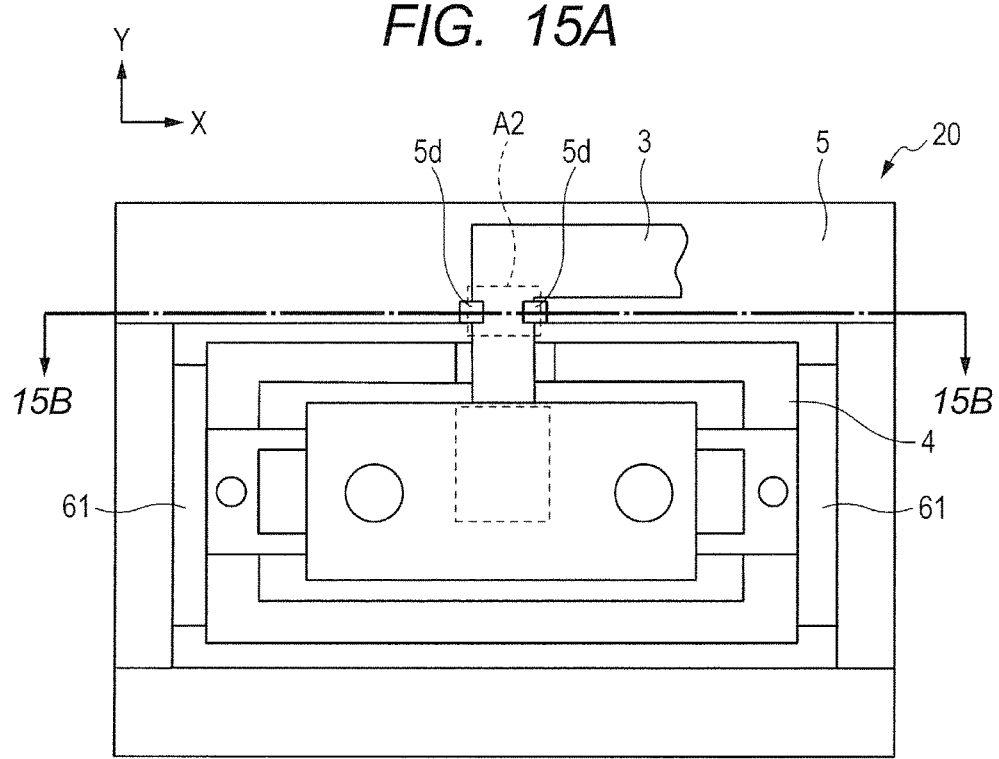
Figure 15B:
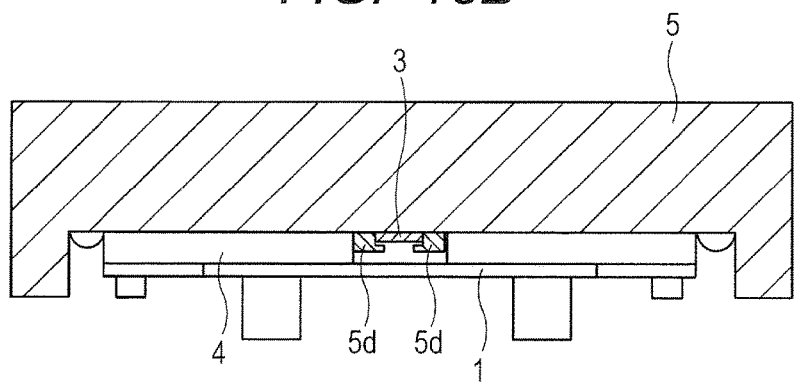

Any fixing method is employable as long as the flexible substrate 3 is fixed to the second holding member 5 such that the movements in the X and Z directions are regulated, and the movement in the Y direction is not regulated, as in the second embodiment. For example, FIGS. 15A and 15B show a modification of the second embodiment. The flexible substrate 3 is fixed by fixing pawls 5d. FIG. 15A is a bottom view of the driving unit 20, and FIG. 15B is a sectional view taken along a section line 15B-15B in FIG. 15A. The fixing pawls 5d that fix the flexible substrate 3 include two elements spaced part in the X direction. The two fixing pawls 5d fix the flexible substrate 3 such that the movements in the X and Z directions are regulated, and the movement in the Y direction is not regulated.

Third Embodiment

The third embodiment of the present invention will be described below with reference to FIGS. 16A and 16B. The third embodiment is different from the first embodiment in that a flexible substrate 3 is fixed to a first holding member 4. Note that the same reference numerals as in the first embodiment denote the same members. A description of the same portions as in the first embodiment will be omitted, and only portions different from the first embodiment will be described.

Figure 16A:
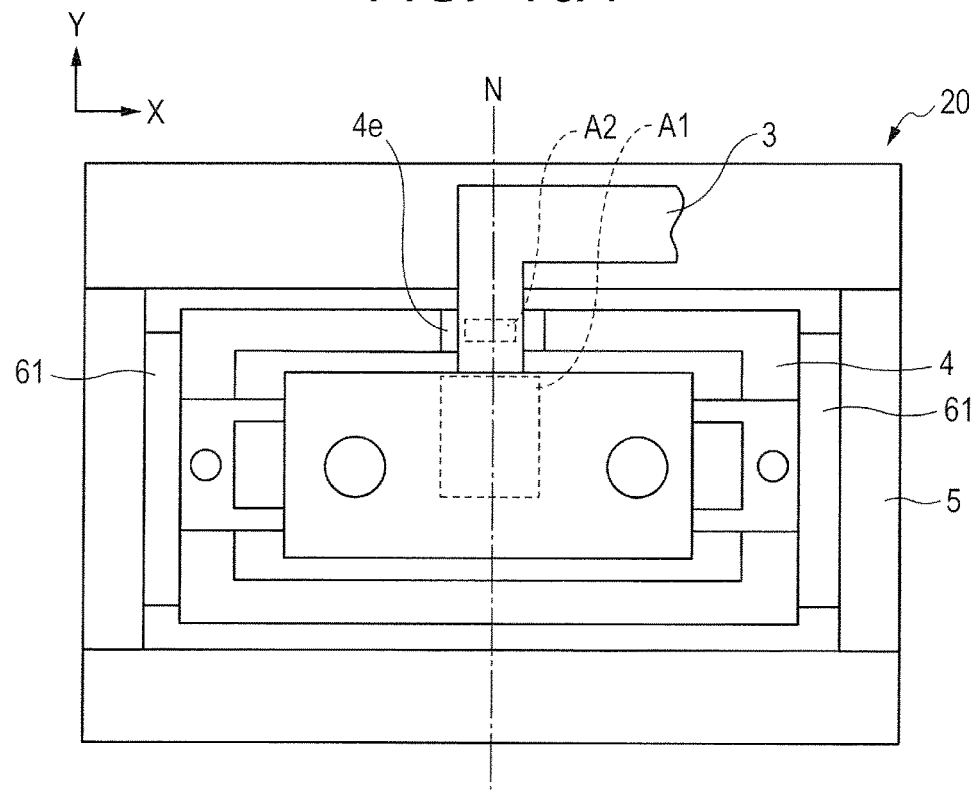
Figure 16B:
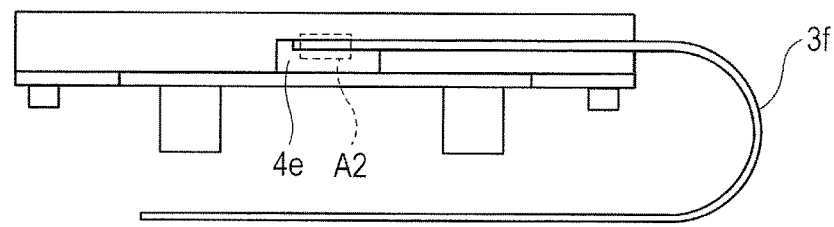

FIG. 16A is a bottom view of a driving unit 20, and FIG. 16B is a front view. Note that in FIG. 16B, a second holding member 5 is not illustrated. The flexible substrate 3 is fixed on a fixing surface 4e of the first holding member 4 at a second fixing portion A2 by a double-sided adhesive tape. That is, the flexible substrate 3 includes a first fixing portion A1 fixed to a piezoelectric element 2, the second fixing portion A2 fixed to the first holding member 4, and a bending portion 3f that makes a flection deformation along with a movement of a vibrating plate 1. The second fixing portion A2 is provided between the first fixing portion A1 and the bending portion 3f. The flexible substrate 3 is fixed to the first holding member 4 on an extension line (N) in a direction to extend from the first fixing portion A1 on the piezoelectric element 2. That is, the second fixing portion A2 is provided on the extension line (N) in the direction in which the flexible substrate 3 extends from the first fixing portion A1.

In the first embodiment in which the flexible substrate 3 is fixed to the second holding member 5, if the relative position changes in the Z direction by a shift amount δ, as shown in FIG. 14B, a tensile load is generated between the first fixing portion A1 and the second fixing portion A2. This impedes the high-frequency vibration of the piezoelectric element 2, and the driving efficiency lowers. However, the flexible substrate 3 is fixed to the first holding member 4, as in the third embodiment, thereby prohibiting a load generated by the flection deformation of the flexible substrate 3 from being transmitted to the piezoelectric element 2. That is, even if the relative position changes in the Z direction by the shift amount δ, no tensile load is generated between the first fixing portion A1 and the second fixing portion A2. For this reason, the high-frequency vibration of the piezoelectric element 2 is not impeded, and the effect of preventing the driving efficiency from lowering is obtained.

Preferred embodiments of the present invention have been described above. However, the present invention is not limited to these embodiments, and various changes and modifications can be made within the spirit and scope of the present invention.

The present invention is usable for an electronic device that needs a compact and light-weight body and a high-speed driving range and, particularly, for a lens driving device or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-234105, filed Nov. 19, 2014, which is hereby incorporated by reference herein in its entirety.

What is claimed is:

1. A driving device comprising:
a vibrating plate including a substantially rectangular flat plate portion and projecting portions provided on the flat plate portion;
a piezoelectric element fixed on the vibrating plate and configured to produce a high-frequency vibration;
a flexible substrate fixed on the piezoelectric element and configured to supply power to the piezoelectric element;
a holding member configured to hold the vibrating plate;
a press member configured to bias the vibrating plate; and
a friction member contacted by the vibrating plate biased by the press member,
wherein the vibrating plate moves relative to the friction member according to the high-frequency vibration of the piezoelectric element,
wherein the flexible substrate comprises a first fixing portion fixed to the piezoelectric element, a second fixing portion fixed to the holding member, and a bending portion configured to make flection deformation along with movement of the vibrating plate, and
wherein the second fixing portion is provided between the first fixing portion and the bending portion along the flexible substrate.

2. The driving device according to claim 1, wherein the flexible substrate extends from a position serving as a node of a vibration mode of the vibrating plate.

3. The driving device according to claim 1, wherein the holding member is divided into a first holding member configured to hold the vibrating plate and a second holding member configured to hold the first holding member, and
the flexible substrate is fixed to one of the first holding member and the second holding member.

4. The driving device according to claim 1, wherein the second fixing portion is provided on an extension line in a direction in which the flexible substrate extends from the first fixing portion.

5. The driving device according to claim 1, wherein a direction in which the flexible substrate extends from the first fixing portion is a direction perpendicular to a moving direction of the vibrating plate and a press direction of the vibrating plate.

6. The driving device according to claim 1, wherein the flexible substrate is fixed at the second fixing portion such that movements in a moving direction of the vibrating plate and a press direction of the vibrating plate are regulated, and a movement in a direction perpendicular to the moving direction and the press direction is not regulated.

7. The driving device according to claim 1, wherein a frequency of the high-frequency vibration generated by the piezoelectric element is different from a resonance frequency of a natural vibration mode of the flexible substrate between the first fixing portion and the second fixing portion out of the flexible substrate.

8. The driving device according to claim 1, wherein the driving device comprises an ultrasonic motor.

9. A driving device comprising:
a vibrating member including a plate portion on which a piezoelectric element is fixed and a projecting portion;
a flexible substrate fixed to the piezoelectric element and configured to supply power to the piezoelectric element; and
a movable member configured to move with the vibrating member,
wherein the vibrating member moves relative to a friction member contacting the projecting portion according to vibration of the vibrating member,
wherein the flexible substrate comprises a first fixing portion fixed to the piezoelectric element, a second fixing portion fixed to the movable member, and a bending portion configured to make flection deformation along with movement of the vibrating member, and
wherein the second fixing portion is provided between the first fixing portion and the bending portion along the flexible substrate.

* * * * *